United States Patent
Cho et al.

(10) Patent No.: US 7,318,975 B2
(45) Date of Patent: Jan. 15, 2008

(54) MEMBRANE ELECTRODE ASSEMBLY OF FUEL CELL

(75) Inventors: Tae-Hee Cho, Gyeongsangnam-Do (KR); Myung-Seok Park, Gyeongsangnam-Do (KR); Hong Choi, Gyeongsangnam-Do (KR); Kyu-Jung Kim, Gyeonggi-Do (KR); Myeong-Ho Lee, Busan (KR); Cheol-Hwan Kim, Gyeongsangnam-Do (KR); Yong-Jun Hwang, Gyeongsangnam-Do (KR); Seong-Tae Ko, Daegu (KR); Seong-Geun Heo, Busan (KR)

(73) Assignee: LG Electronics Inc., Seoul (KR)

( * ) Notice: Subject to any disclaimer, the term of this patent is extended or adjusted under 35 U.S.C. 154(b) by 594 days.

(21) Appl. No.: 10/483,812

(22) PCT Filed: Dec. 5, 2003

(86) PCT No.: PCT/KR03/02663
§ 371 (c)(1), (2), (4) Date: Jan. 15, 2004

(87) PCT Pub. No.: WO2005/055357
PCT Pub. Date: Jun. 16, 2005

(65) Prior Publication Data
US 2005/0123820 A1    Jun. 9, 2005

(51) Int. Cl.
*H01M 2/14* (2006.01)

(52) U.S. Cl. .......................................... 429/38; 429/39
(58) Field of Classification Search .................... None
See application file for complete search history.

(56) References Cited

U.S. PATENT DOCUMENTS

| 4,037,023 | A | * | 7/1977 | Grehier et al. | 429/12 |
| 4,091,176 | A | * | 5/1978 | Alfenaar | 429/40 |
| 5,599,640 | A | * | 2/1997 | Lee et al. | 429/46 |

FOREIGN PATENT DOCUMENTS

DE    EP 1286408    *    2/2003

* cited by examiner

*Primary Examiner*—Patrick Joseph Ryan
*Assistant Examiner*—Julian Mercado
(74) *Attorney, Agent, or Firm*—Ked & Associates LLP

(57) ABSTRACT

In a MEA (membrane electrode assembly) of a fuel cell including an electrolyte membrane as an ion transfer medium arranged between a bipolar plate having a fuel side open groove in which fuel flows and a bipolar plate having an air side open groove in which air flows so as to form a fuel path with the fuel side open groove and form an air path with the air side open groove; and a catalyst electrode inserted into the fuel side open groove so as to be separated from the electrolyte membrane in order to form a fuel path with both sides thereof and induce electrochemical oxidation with the fuel, by activating action occurred on the fuel electrode in which fuel is supplied and the air electrode in which air is supplied, current generating efficiency can be improved.

18 Claims, 4 Drawing Sheets

MEMBRANE ELECTRODE ASSEMBLY OF FUEL CELL

TECHNICAL FIELD

The present invention relates to a fuel cell, and in particular to a MEA (membrane electrode assembly) of a fuel cell capable of promoting electrochemical oxidation and reduction reaction occurred on a fuel electrode (anode) in which fuel is supplied and an air electrode (cathode) in which air is supplied.

BACKGROUND ART

Fuel cell has been presented as a substitute for fossil fuel. In the fuel cell, fuel including hydrogen is continually supplied, simultaneously air including oxygen is continually supplied, the hydrogen and the oxygen pass electrochemical reaction, and accordingly energy difference between before and after the reaction is directly converted into electric energy.

Fuel cells can be classified into various kinds according to kinds of fuel, operational temperature and catalyst, etc.

FIGS. 1 and 2 illustrate an example of the fuel cell. As depicted in FIGS. 1 and 2, in the fuel cell, a MEA (membrane electrode assembly) 200 is inserted between a pair of bipolar plates 100. Open grooves 110, 120 in which a fluid flows are respectively formed on both sides or a side of the bipolar plate 100. Inflow paths 130, 140 and outflow paths 150, 160 for making the fluid flow into/out of the open grooves 110, 120 are respectively formed on both sides of the bipolar plate 100. In the MEA 200, a fuel electrode (anode) 220 contacted to fuel is formed on a side of an electrolyte membrane 210 having a certain area, and an air electrode (cathode) 230 contacted to air is formed on the other side of the electrolyte membrane 210.

With the open grooves 110, 120, a fuel path in which fuel flows and an air path in which air flows are respectively formed on both sides of the MEA 200. Herein, the fuel electrode 220 is arranged on the fuel side open groove 410, 110, and the air electrode 230 is arranged on the air side open groove 420, 120.

In the above-described fuel cell, when fuel flows into the inflow path 130 of the bipolar plate 100, simultaneously air flows into the inflow path 140 of the other bipolar plate 100. The fuel in the inflow path 130 flows through the open groove 110 and is discharged through the outflow path 150. The air in the inflow path 140 flows through the open groove 120 and is discharged through the outflow path 160. The fuel discharged through the outflow path 150 flows into the inflow path 130 by an additional device and is circulated.

In the process for making the fuel flow in the open groove 110, electrochemical oxidation reaction occurs on the fuel electrode 220 of the MEA 200 contacted to the open groove 110, the hydrogen ions are moved to the air electrode 230 through the electrolyte membrane 210, and the electrons are moved to the air electrode 230 through a load (not shown) connecting the fuel electrode 220 with the air electrode 230. Simultaneously, while the air flows in the open groove, electrochemical reduction reaction occurs on the air electrode 230 of the MEA contacted to the open groove 120, hydrogen ion is combined with oxygen, and accordingly water, heat of reaction and additional byproducts are generated. By continuing that process, electrons are moved from the anode (fuel electrode) to the cathode (air electrode) through a load, and electric energy is generated.

The fuel electrode 220 and the air electrode 230 of the fuel cell on which oxidation and reduction reaction occur are generally constructed as a catalyst electrode having a catalyst for activating reaction.

Reference numeral 300 is a collector plate.

FIG. 3 illustrates a MEA of a fuel cell in accordance with the conventional art. As depicted in FIG. 3, in the MEA of the fuel cell, a catalytic layer 221, 231 is respectively coated on both sides of the electrolyte membrane 210 having a certain thickness and a rectangular area, and a coating layer 222, 232 is respectively coated onto the catalytic layer 221, 231. The catalytic layer 221 and the coating layer 222 formed on a side of the electrolyte membrane 210 construct a fuel electrode, and the catalytic layer 231 and the coating layer 232 formed on the other side of the electrolyte membrane 210 construct the air electrode.

In that structure, when fuel and air flow through the open grooves 110, 120 respectively, while oxidation and reduction reaction occur on the fuel electrode 220 and the air electrode 230 of the MEA, reaction of fuel is activated by catalytic reaction of the catalytic layer 221, and hydrogen ions are moved to the air electrode 230 through the electrolyte membrane 210. Herein, when fuel in which hydrogen forming agent such as NaBH4, KBH4, LiAlH4, KH and NaH, etc. is dissolved in an alkali aqueous solution is used, because the fuel is an electrolyte solution, electrons generated with hydrogen ions are moved to the air electrode 230 through the electrolyte solution and the bipolar plate 100.

However, in the conventional structure, when hydrogen ions generated by catalytic reaction by the catalytic layer 221 of the fuel electrode 220 move to the air electrode 230 through the coating layer 222, the catalytic layer 221 and the electrolyte membrane 210, because the catalytic layer 221 of the fuel electrode 220 is coated onto the electrolyte membrane 210, the coated catalytic layer 221 disturbs movement of hydrogen ions toward to the air electrode 230 through the electrolyte membrane 210, ionic action (catalytic action) is active only on a side of the catalytic layer 221, on the contrary, ionic action does not occur on a side contacted to the electrolyte membrane 210, and accordingly current generating efficiency is lowered.

TECHNICAL GIST OF THE PESENT INVENTION

In order to solve the above-described problem, it is an object of the present invention to provide a MEA (membrane electrode assembly) of a fuel cell capable of improving of current generating efficiency by promoting electrochemical oxidation and reduction reaction occurred on a fuel electrode in which fuel is supplied and an air electrode in which air is supplied.

In order to achieve the above-mentioned object, a MEA of a fuel cell in accordance with the present invention includes an electrolyte membrane as an ion transfer medium interposed between a bipolar plate having a fuel side open groove in which fuel flows and a bipolar plate having an air side open groove in which air flows so as to form a fuel path with the fuel side open groove and form an air path with the air side open groove; and a catalyst electrode inserted into the fuel side open groove so as to be separated from the electrolyte membrane in order to form a fuel path with both sides thereof and induce reaction with the fuel.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, the preferred embodiments of the present invention will be described with reference to accompanying drawings.

Figure 1:
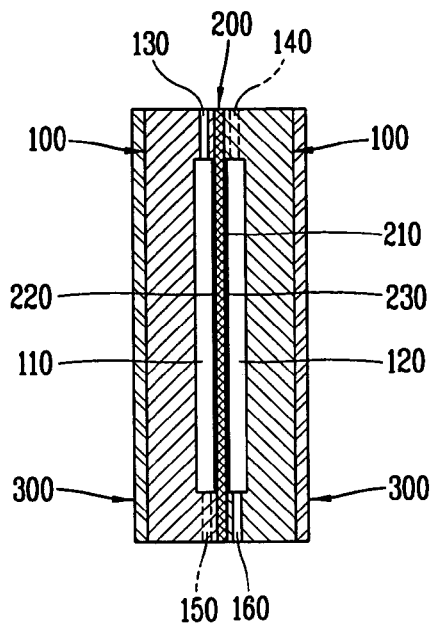
FIG. 1 is a sectional view illustrating a general fuel cell.
Figure 2:
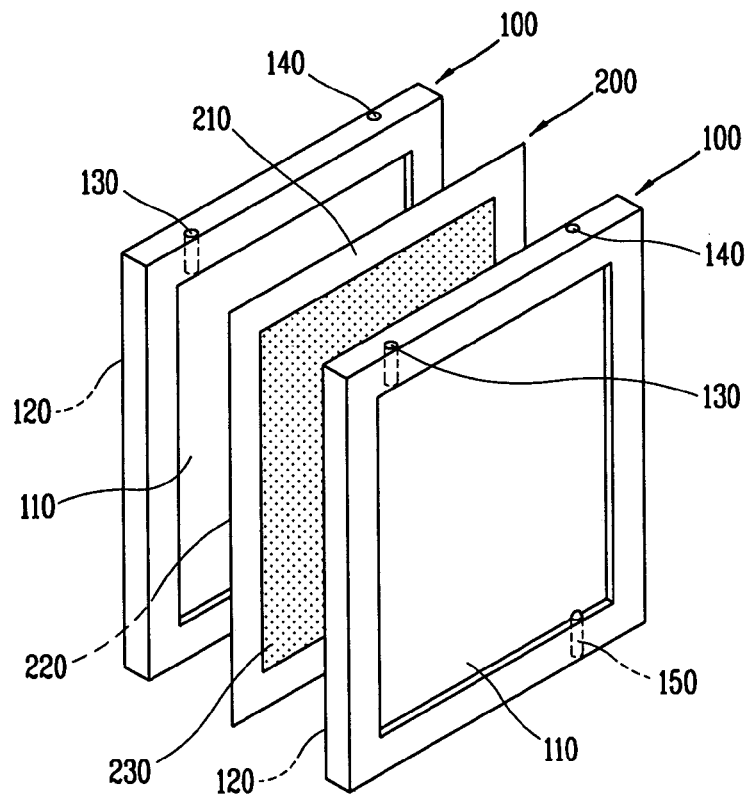
FIG. 2 is an exploded-perspective view illustrating the general fuel cell.
Figure 3:
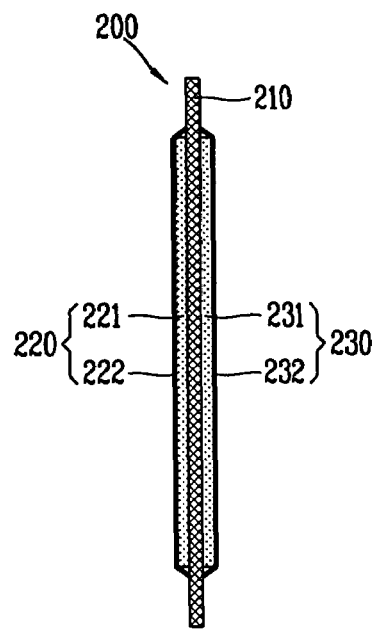
FIG. 3 is a sectional view illustrating a MEA (membrane electrode assembly) of a fuel cell in accordance with the conventional art.
Figure 4:
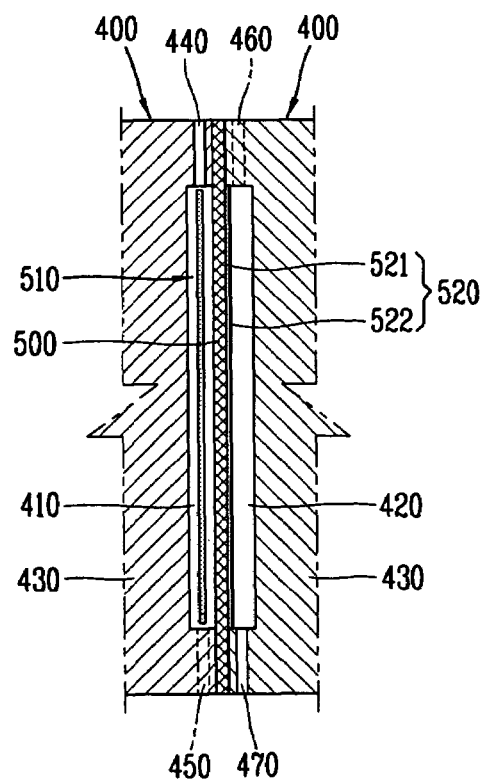
FIG. 4 is a sectional view illustrating a MEA of a fuel cell in accordance with the present invention.

FIG. 4 is a front-sectional view illustrating a MEA (membrane electrode assembly) of a fuel cell in accordance with the present invention.

As depicted in FIG. 4, the MEA of the fuel cell in accordance with the present invention includes an electrolyte membrane 500 as an ion transfer medium arranged between a bipolar plate 400 having a fuel side open groove 410 in which fuel flows and a bipolar plate 400 having an air side open groove 420 in which air flows so as to form a fuel path with the fuel side open groove 410 and form an air path with the air side open groove 420; and a catalyst electrode 510 inserted into the fuel side open groove 410 so as to be separated from the electrolyte membrane 500 in order to form a fuel path with both sides thereof and induce electrochemical reaction with the fuel.

In the bipolar plate 400, an open fuel side open groove 410 having a certain depth and area is formed on a side of a rectangular plate 430 having a certain thickness, an inflow path 440 and an outflow path 450 in which fuel flows into/out of the fuel side open groove 410 are formed on the plate 430, and an inflow path 460 and an outflow path 470 in which air flows into/out of the air side open groove 420 are formed on the plate 430. The fuel side open groove 410, the inflow path 460 and the outflow path 450 have the same shape with the air side open groove 420, the inflow path 460 and the outflow path 470.

The bottom of the fuel side open groove 410 is plane. In addition, as a modification, a straight path can be formed on the bottom of the fuel side open groove 410.

The electrolyte membrane 500 is formed as a sheet metal having a size similar to that of the bipolar plate 400.

The electrolyte membrane 500 is placed between the two bipolar plates 400.

A fuel path in which fuel flows is formed by the fuel side open groove 410 of one bipolar plate 400 of the pair and a side of the electrolyte membrane facing the fuel side open groove 410, and an air path in which air flows is formed by the air side open groove 420 of the other bipolar plate of the pair and the other side of the electrolyte membrane 500.

The catalyst electrode 510 is formed so as to have a certain thickness and area. The catalyst electrode 510 is inserted into the fuel path formed by the electrolyte membrane 500 and the fuel side open groove 410 so as to be separated from the electrolyte membrane 500. By inserting the catalyst electrode 510 into the fuel side open groove 410, the fuel path formed by the fuel side open groove 410 and the electrolyte membrane 500 has a path on both sides centering around the catalyst electrode 510.

Figure 5:
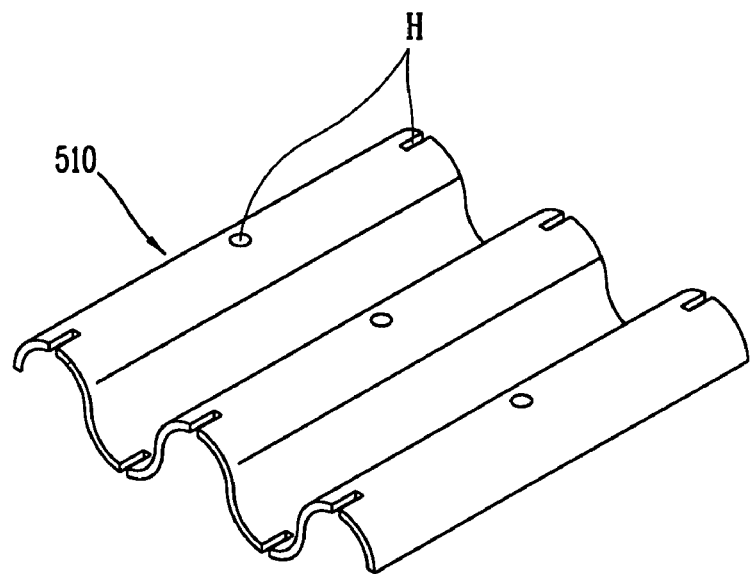
FIG. 5 is a perspective view illustrating a catalyst electrode of the MEA of the fuel cell in accordance with the present invention.

In a modification of the catalyst electrode 510, as depicted in FIG. 5, the catalyst electrode 510 is formed as a corrugate shape having a certain thickness and area so as to increase a contact area with fuel. The catalyst electrode 510 has a certain thickness and a section in which hemispheres are connected up and down, and corrugations in the section are formed in the length direction. And, plural through holes (H) may be formed on both ends or inside the catalyst electrode 510.

Figure 6:
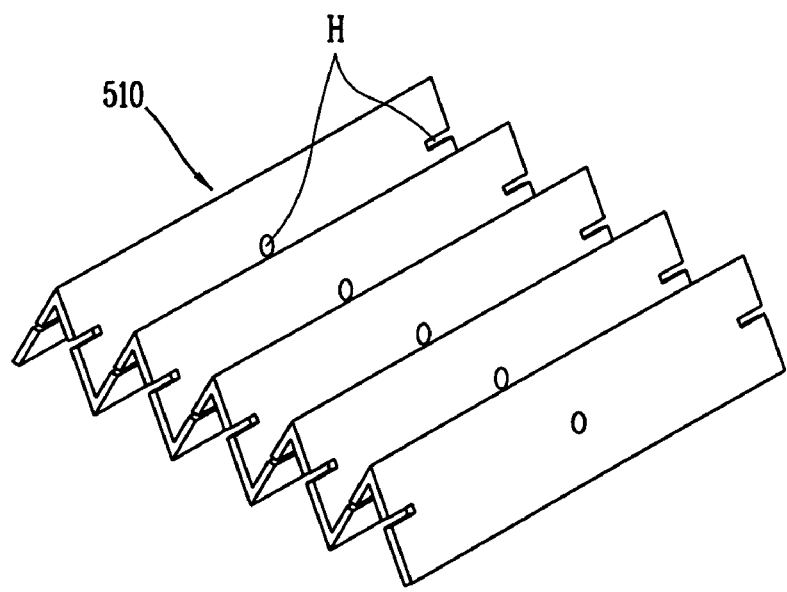
FIGS. 6 and 7 are perspective views respectively illustrating modifications of a catalyst electrode of the MEA of the fuel cell in accordance with the present invention.

In another modification of the catalyst electrode 510, as depicted in FIG. 6, the catalyst electrode 510 is formed as a folded shape having a certain thickness and area in order to increase a contact area with fuel. The catalyst electrode 510 has a certain thickness, a section thereof is formed as a saw tooth shape, and folds in the section are formed in the length direction. And, plural through holes (H) may be formed on both ends or inside the catalyst electrode 510.

Figure 7:
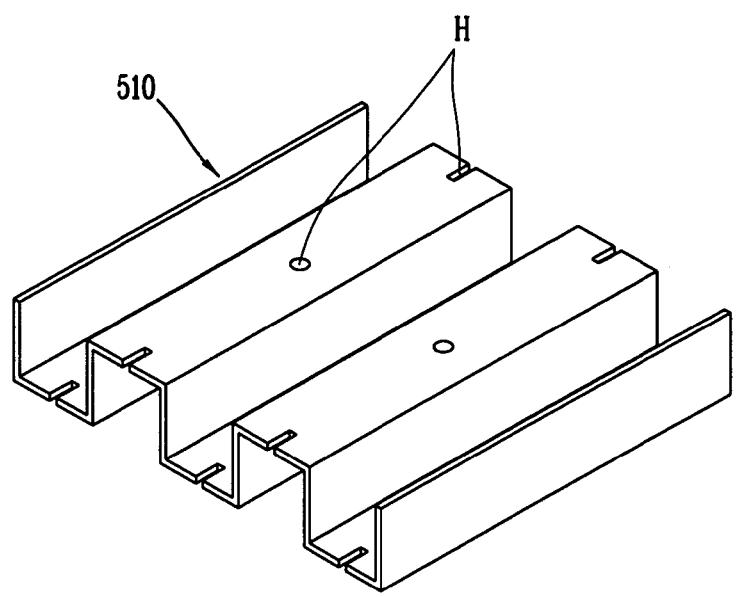

In yet another modification of the catalyst electrode 510, as depicted in FIG. 7, a section thereof is formed as a rectangular shape in the length direction. And, plural through holes (H) may be formed on both ends or inside the catalyst electrode 510.

The catalyst electrode 510 is made of a fiber material, in more detail, a nickel micro fiber material.

In another embodiment, the catalyst electrode 510 can be made of hydrogen storage alloy.

It is preferable for the fuel to be an electrolyte solution having a hydrogen forming agent.

The air electrode 520 on the air side open groove 420 is adhered to the electrolyte membrane 500. In more detail, alike the conventional structure, in order to make the air electrode 520 place on the air side open groove 420, a catalytic layer 521 on which a catalyst is coated and a coating layer 522 for covering the catalytic layer 521 are formed on a side of the electrolyte membrane 500.

The air electrode 520 can be separately fabricated and inserted into the air side open groove 420 so as to be separated from the electrolyte membrane 500.

The bottom of the fuel side open groove 410 is plane.

The bipolar plates 400 and the electrolyte membrane 500 are combined by an additional combining means, and the number of the bipolar plates 400 can be two (pair) or not less than two. When there is a pair of bipolar plates 400, the fuel side open groove 410, the inflow path 440 and the outflow path 450 are formed on a side of the bipolar plate 400, and the air side open groove 420, the inflow path 460 and the outflow path 470 are formed on a side of the other bipolar plate 400.

Hereinafter, the operation of the MEA of the fuel cell in accordance with the present invention will be described.

A case using fuel in which hydrogen forming agent such as NaBH4, KBH4, LiAlH4, KH and NaH, etc. is dissolved in an alkali aqueous solution will be described. When the fuel flows into the inflow path 440 of the bipolar plate 400, and simultaneously air flows into the inflow path 460 of the other bipolar plate 400.

The fuel flowing into the inflow path 440 flows through the fuel path formed by the fuel side open groove 410 and the electrolyte membrane 500 while contacting to both sides of the catalyst electrode 510 inserted into the fuel side open groove 410, namely, the whole surface of the catalyst electrode 510. Herein, when electrochemical oxidation reaction occurs in the fuel by the catalyst electrode 510, hydrogen ions and electrons are generated, the electrons are moved to the air electrode 520, and the hydrogen ions are moved to the air electrode 520 through the fuel as the electrolyte and the electrolyte membrane 500.

Simultaneously, when the air in the inflow path 460 flows through the air path formed by the air side open groove 420 and the electrolyte membrane 500, electrochemical reduction reaction of the hydrogen ions and oxygen occurs on the air electrode 520 of the electrolyte membrane 500.

The fuel passing the fuel path flows out through the outflow path 450, the air passing the air path flows out through the air side outflow path 470, the fuel passing the fuel side outflow path 450 flows into the inflow path 440 by an additional device, and the circulating process is repeated.

Figure 8:
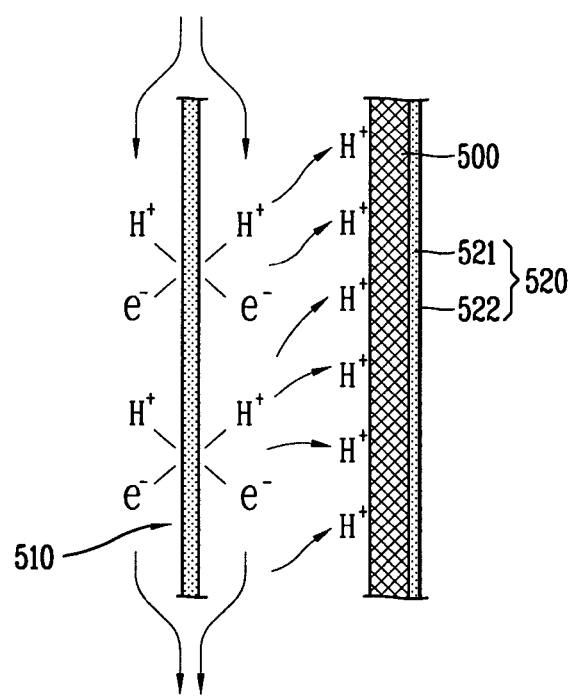
FIG. 8 is a sectional view illustrating an operation state of the MEA of the fuel cell in accordance with the present invention.

In the process, as depicted in FIG. 8, because the catalyst electrode 510 is separated from the electrolyte membrane 500 and is placed on the fuel side open groove 410, both sides of the catalyst electrode 510, namely, the whole area of the catalyst electrode 510 is contacted with the fuel, and accordingly catalytic action can be occurred on a wider area. And, because the catalyst electrode 510 is separated from the electrolyte membrane 500 and is placed on the fuel side open groove 410, hydrogen ions generated by the catalyst electrode 510 can be moved to the air electrode through the whole area of the electrolyte membrane 500 without being disturbed by the hydrogen ions generated by the catalyst electrode 510, and accordingly movable region of the hydrogen ions can be increased.

And, when the catalyst electrode 510 is formed as a corrugate shape or a fold shape, a contact area between the catalyst electrode 510 and the fuel is increased. In addition, when the catalyst electrode 510 is formed as a corrugate shape or a fold shape, a path in which fuel flows is formed by the corrugations or folds, there is no need to form an additional path on the bottom of the fuel side open groove 410.

INDUSTRIAL APPLICABILITY

As described-above, in a MEA (membrane electrode assembly) of a fuel cell in accordance with the present invention, catalytic reaction occurs by increasing a contact area between fuel and a catalyst electrode on which electrochemical oxidation reaction occurs, ion generation can be activated, a region in which hydrogen ions are moved to an air electrode, namely, a region on an electrolyte membrane is increased, mobility of hydrogen ions is increased, reaction on the air electrode can be activated more, and accordingly generation efficiency of electric energy can be improved.

The invention claimed is:

1. A fuel cell, comprising:
   first and second bipolar plates;
   an electrolyte membrane configured to act as an ion transfer medium and configured to be interposed between the first and second bipolar plates, wherein the first bipolar plate forms a fuel side open groove with the electrolyte membrane and the second bipolar plate forms an air side open groove with the electrolyte membrane and wherein the electrolyte membrane forms a fuel path with the fuel side open groove and forms an air path with the air side open groove, respectively; and
   a catalyst electrode having first and second sides and being configured to be inserted into the fuel side open groove so as to be separated from the electrolyte membrane in order to form fuel flow paths adjacent both of the first and second sides thereof and induce reaction with the fuel.

2. The MEA of claim 1, wherein the catalyst electrode is formed as a corrugate shape having a certain thickness and area so as to increase a contact area with fuel.

3. The MEA of claim 2, wherein the catalyst electrode has a certain thickness and a section in which hemispheres are connected up and down.

4. The MEA of claim 1, wherein the catalyst electrode is formed as a folded shape having a certain thickness and area in order to increase a contact area with fuel.

5. The MEA of claim 4, wherein the catalyst electrode has a certain thickness and has a section formed as a saw tooth shape.

6. The MEA of claim 4, wherein the catalyst electrode has a certain thickness and a section formed as a rectangular shape in the length direction.

7. The MEA of claim 1, wherein the catalyst electrode is made of a fiber material.

8. The MEA of claim 1, wherein the catalyst electrode is made of a nickel micro fiber material.

9. The MEA of claim 1, wherein fuel is an electrolyte solution having a hydrogen forming agent.

10. The MEA of claim 1, wherein the catalyst electrode is made of hydrogen storage alloy.

11. The MEA of claim 1, wherein the air electrode placed on the air side open groove is attached to or detached from the electrolyte membrane.

12. A fuel cell, comprising:
    first and second bipolar plates; and
    a membrane electrode assembly mounted between the bipolar plates such that a fuel side open groove is formed on a first side of the membrane electrode assembly adjacent the first bipolar plate and such that an air side open groove is formed on a second side of the membrane electrode assembly adjacent the second bipolar plate, wherein the membrane electrode assembly comprises:
    an electrolyte membrane configured to act as an ion transfer medium; and
    a catalyst electrode located between the electrode membrane and the first bipolar plate and spaced apart from the electrode membrane.

13. The fuel cell of claim 12, wherein the catalyst electrode has first and second sides and is spaced apart from the electrode membrane such that first and second fuel flow paths are formed, respectively, on the first and second sides of the catalyst electrode.

14. The fuel cell of claim 13, wherein the first fuel flow path is formed between the first bipolar plate and the catalyst electrode, and wherein the second fuel flow path is formed between the second side of the catalyst electrode and the electrolyte membrane.

15. The fuel cell of claim 12, wherein the catalyst electrode is formed as a corrugate shape having a certain thickness and area so as to increase a contact area with fuel.

16. The fuel cell of claim 15, wherein the catalyst electrode has a certain thickness and a section in which hemispheres are connected up and down.

17. The fuel cell of claim 12, wherein the catalyst electrode is formed as a folded shape having a certain thickness and area in order to increase a contact area with fuel.

18. The fuel cell of claim 17, wherein the catalyst electrode has a certain thickness and has a section formed as at least one of a saw tooth shape or a rectangular shape in the length direction.

* * * * *